(No Model.)

D. KNOWLTON.
CAR BRAKE AND STARTER.

No. 388,205. Patented Aug. 21, 1888.

Witnesses:
Thos. Houghton.
J. A. Ferris.

Inventor:
Dallas Knowlton.
By his Attorney.
A. T. C. Dodge.

UNITED STATES PATENT OFFICE.

DALLAS KNOWLTON, OF BRANTFORD, ONTARIO, CANADA.

CAR BRAKE AND STARTER.

SPECIFICATION forming part of Letters Patent No. 388,205, dated August 21, 1888.

Application filed January 4, 1888. Serial No. 259,801. (No model.)

*To all whom it may concern:*

Be it known that I, DALLAS KNOWLTON, a subject of the Queen of Great Britain, residing at the city of Brantford, in the county of Brant in the Province of Ontario, Canada, have invented certain new and useful Improvements in Car Brakes and Starters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
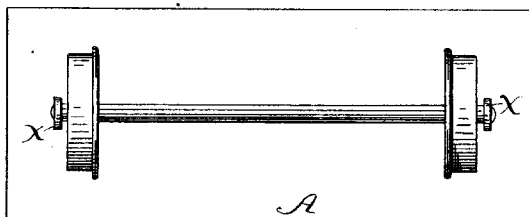
Figure 2:
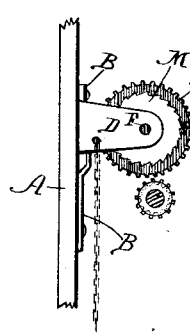
Figure 2:
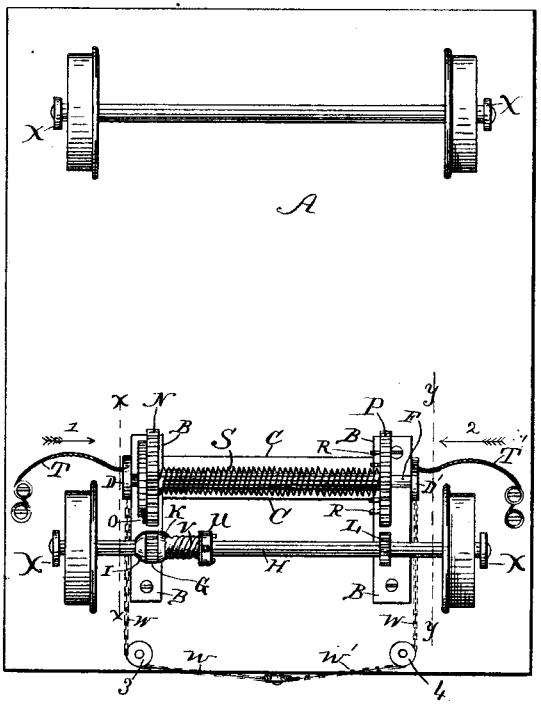
Figure 4:
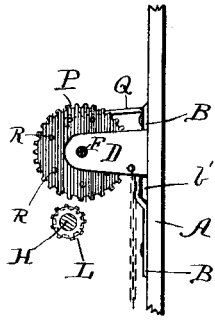
Figure 3:
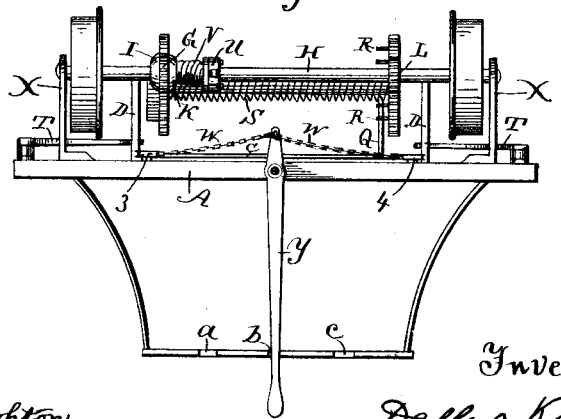

In the drawings, Figure 1 is an inverted plan view of the floor of a tramway-car with my improved brake and starting mechanism applied thereto. Figs. 2 and 3 show in side elevation the sliding frame that carries the brake and starting mechanism, and in section one of the wheel-axles illustrating the gearing for winding up the power-spring and for applying the stored power to the wheel-axle. Fig. 4 shows my improved brake and starting mechanism by an end view.

This invention relates to car brakes and starters and has for its object to provide means for storing power while the car is running or when a car is being stopped, and for utilizing the stored power for starting the car at each stoppage. I thus not only relieve the horses of the extra exertion required in winding up the power-spring, but utilize the momentum of the car to wind up said spring, which is thus made to perform the function of a brake.

To these ends the invention consists in structural features and combinations of parts, substantially as hereinafter described, and as set forth in the claims.

In the drawings, A indicates the car bottom or floor, and B B are two guide bars or plates bolted to the under side of the car, and so constructed as to form a guide-slot, $b'$, through which project the ends of a slide plate or frame, C. This frame C has at opposite ends, and preferably outside of the guide-bars B, a bearing, D and D', respectively, for a shaft, F.

A toothed wheel, N, is loosely mounted at or near one end of shaft F, and beside said wheel is mounted a ratchet-wheel, M, that is rigidly connected with the bearing D of frame C. A pawl, O, pivoted to wheel N, serves to lock the latter to the shaft F, and thereby cause the said wheel to be revolved whenever brought into gear with a winding-pinion on one of the wheel-axles. At or near its opposite end the shaft F carries a second toothed wheel, P, from the inner face of which project pins R, adapted to engage the hook end of a pendent locking-bar, Q, bolted to the car-bottom, said bar being more or less elastic, so as to yield to any horizontal pressure exerted thereon. The frame C is held at one end of the guide-slots $b'$ by springs T T', which are shown as arranged at opposite ends of the said frame C, the free ends of said springs being secured to the bearings D D' in any suitable or preferred manner.

Near the end of the car are pivoted guide-pulleys 3 and 4, one for each end of the frame C, and Y is the brake and starter lever, pivoted to the front of the car and secured in position by placing it in one of the stop-notches $a$, $b$, or $c$, preferably formed in the dash-board rail. The lever Y is connected by two chains, W and W', with the bearings D and D', respectively, of the frame C, as shown, said chains being properly guided by the pulleys 3 and 4.

Between the toothed wheels N and P is a power-spring, S, coiled on shaft F. One end of said spring is connected with the toothed wheel N and the other end with the toothed wheel P, or with the shaft when said toothed wheel P is rigidly mounted on said shaft.

On the wheel-axle H are mounted two pinions, G and L, that mesh with the wheels N and P, respectively. The pinion L is fast on the axle H, while the pinion G is locked thereto by a friction-clutch consisting of an abutting-disk, I, fast on axle H, and a friction-disk, K, loose in said axle and held against the pinion G by the stress of a spring, V, the tension of which is adjustable by means of a collar, U, and a set bolt or bolts, $u$, a washer being preferably interposed between the spring V and collar U, for obvious purposes. The power exerted by the spring V should be equal to that of the starting-spring S when fully or nearly fully wound up, so as to hold the pinion G locked to the wheel-axle until said spring S is fully or nearly fully wound up, when an increase in the power exerted will overcome the frictional resistance of the disk K and cause the wheel-axle to revolve independently of said pinion.

The described mechanism is duplicated at opposite ends of the car, if it is desirable that the car should not be turned when it reaches the terminal of its route.

The operation of the brake and starter is as follows, it being borne in mind that the sliding frame C is held at its ends by independent springs T T' in the end of the slot $b'$ in the guide-bars B, so that either end of the frame can be moved forward against the stress of its spring without carrying the other end along also. If the spring S is to be wound up, the lever Y is shifted from the central notch, $b$, to the notch $a$, thus drawing forward that end of the frame C that carries the winding mechanism, the opposite end being held back in position by its spring T', and the starting-wheel P is held locked by engagement of one of the pins R thereon with the hooked end of the elastic or spring locking-bar Q. The forward movement of the frame C brings the wheel N in gear with the pinion G, and if the car is in motion the spring S will be wound up and held against unwinding by the ratchet and pawl M O, and by the locking-bar Q and wheel P. The lever Y is now shifted back to its normal position at $b$, to slacken the chain W and allow the spring T to move the frame end back into its normal postion and out of gear with the winding-pinion G. This winding of the spring may be effected at each stoppage of the car to utilize the momentum thereof, the spring S acting as a brake, and if the stoppages are very frequent the winding of the spring may be effected on downgrades, the spring S again acting as a brake as well as the friction-clutch after the spring is fully wound up. To start the car, the lever Y is shifted from $b$ to $c$, thus moving the opposite end of the frame C forward against the stress of its spring T'. In this forward movement the pin R, in engagement with the hook end of arm Q, will be disengaged, so that the shaft F or the wheel P, when said wheel is loose on said shaft, will be free to revolve under the stress of the power-spring S. This release of the wheel P will, however, not take place until the said wheel is about to engage the pinion L. The arm Q, being more or less elastic, is held under sufficient tension by the frame C, when the latter is in its normal position, to cause the resilient end of the arm to follow the movement of the frame until the wheel P is about to engage the pinion L. When the car is started, the lever Y is again returned to $b$, thereby slackening chain W' and permitting the spring T' to return the frame into its normal position and simultaneously therewith lock the wheel P against rotation by the means described.

Having described my invention, what I claim is—

1. In a car brake and starter, the combination, with one of the wheel-axles, a fixed driving and a loose winding pinion on said axle, and a clutch mechanism for locking the loose pinion to the axle, of a shaft, connected bearings therefor adjustable toward and from the wheel-axle, a spring at either end of said bearings to hold the same in a normal position away from the wheel-axle, a loose winding-wheel and a driving-wheel on said shaft adapted to gear with the winding or driving pinion on the wheel-axle, a spring coiled on the shaft and connected with the winding and driving wheels, a ratchet-and-pawl mechanism to lock the winding-wheel against rotation in one direction, a fixed stop to lock the driving-wheel against rotation, and actuating mechanism to move either end of the connected shaft-bearings toward the wheel-axle, substantially as and for the purposes described.

2. In a car brake and starter, the combination, with one of the wheel-axles, a fixed driving and a loose winding pinion on said axles, and a friction-clutch mechanism for locking the loose pinion to the axle, of a shaft, connected bearings therefor adjustable toward and from the wheel-axle, a spring at either end of said bearings to hold the same in a normal position away from the wheel-axle, a loose winding-wheel and a driving-wheel on said shaft adapted to gear with the winding or driving pinion on the wheel-axle, a spring coiled on the shaft and connected with the winding and driving wheels, a ratchet-and-pawl mechanism to lock the winding-wheel against rotation in one direction, a fixed resilient stop to lock the driving-wheel against rotation, and actuating mechanism to move either end of the connected shaft-bearings toward the wheel-axle, substantially as and for the purposes specified.

3. The combination, with the frame C, arranged to slide in bearings, and the springs T and T' at opposite ends of said frame, of the chains W and W', connected with the frame ends, and the lever Y, connected with said chains, whereby either end of the frame may be displaced against the stresss of its spring and thereby automatically returned into its normal position, substantially as and for the purposes specified.

4. The combination, with the frame C, arranged to slide in bearings, the springs T and T' at opposite ends thereof, the pendent resilient stop Q, the shaft F, mounted in said frame, and the spring-actuated wheel P, provided with pins projecting from one face thereof engaging the stop Q, of the chains W W', connected with either end of the frame, and the lever Y, connected with both chains, substantially as and for the purposes specified.

5. The combination, with the wheel-axle, a fixed driving and a loose winding pinion on said axle, and the friction-clutch I K V U, of the sliding frame C, the shaft F, mounted therein, the power-spring S, a winding and driving wheel at opposite ends of said spring and connected therewith, said wheels being adapted to mesh with the winding and driving pinions, respectively, on the wheel-axle, the springs T and T', arranged at opposite ends of the frame C and connected therewith, the fixed stop Q, the ratchet and pawl M O, and the operating-chains W W', said parts being arranged for operation substantially as and for the purposes specified.

Brantford, December 29, 1887.

DALLAS KNOWLTON.

In presence of—
 DANL. BROOKE,
 WILLIAM GREEN.